(No Model.)
J. J. HARRITY, Jr.
DRIVING MECHANISM FOR FANS, &c.
No. 498,389.  Patented May 30, 1893.
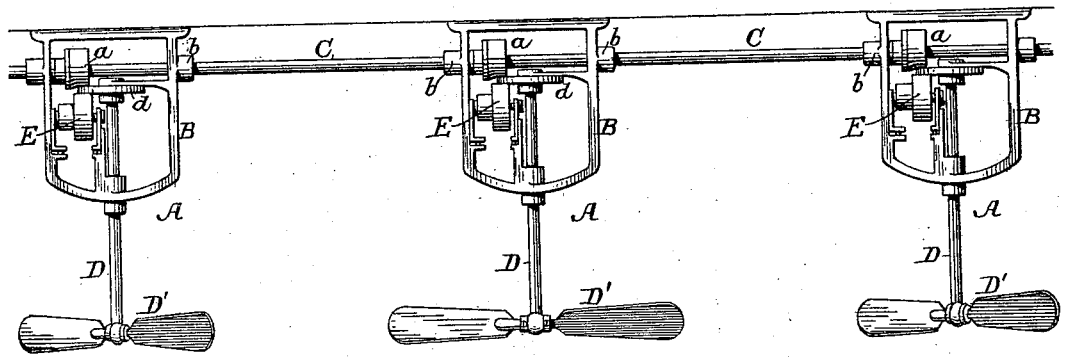
FIG. 1.
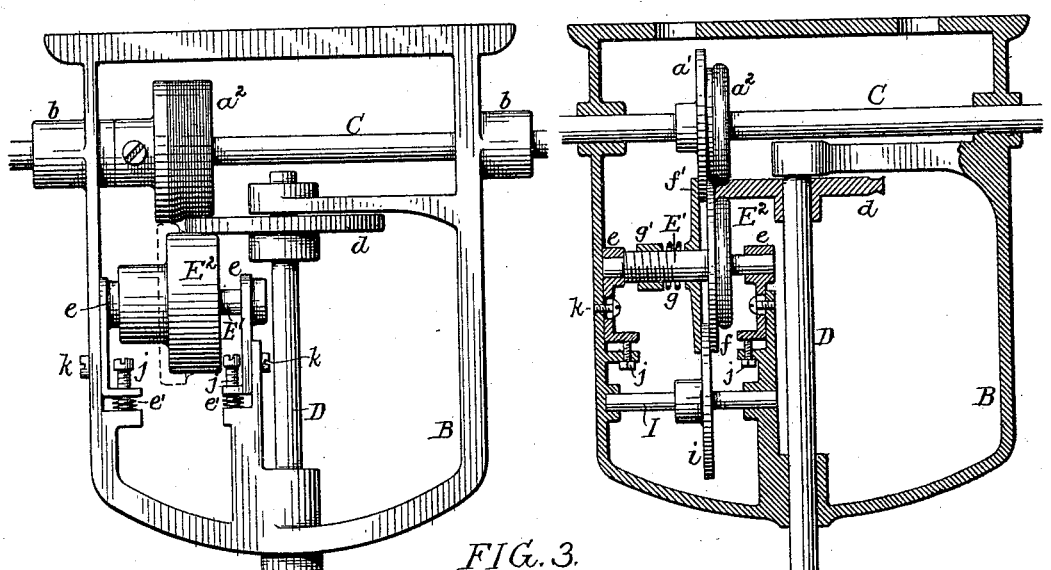
FIG. 4.  FIG. 3.  FIG. 2.
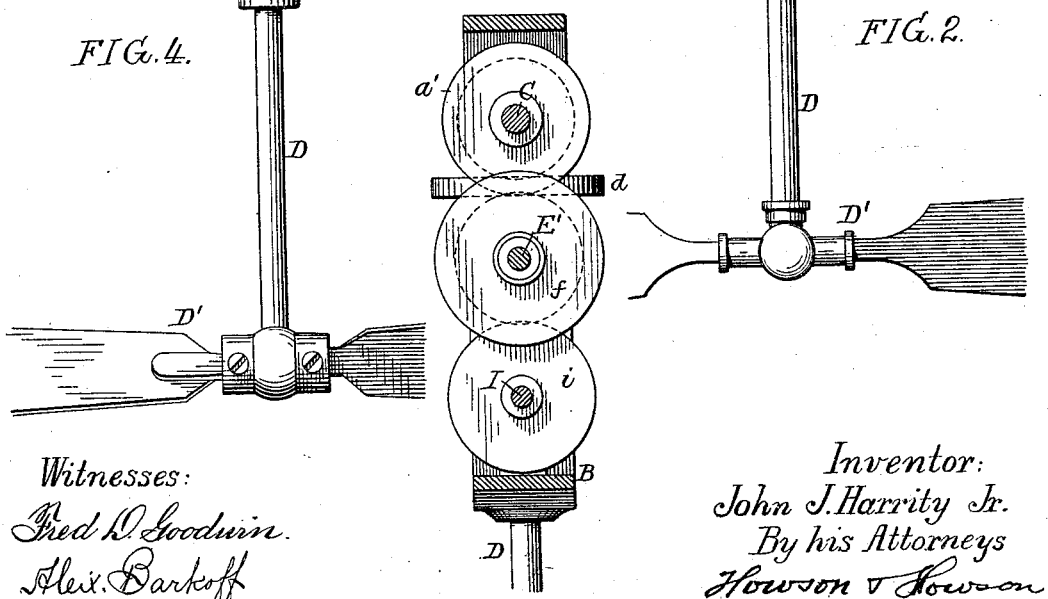
Witnesses:
Fred D. Goodwin
Alex. Barkoff
Inventor:
John J. Harrity Jr.
By his Attorneys
Howson & Howson

UNITED STATES PATENT OFFICE.

JOHN J. HARRITY, JR., OF PHILADELPHIA, PENNSYLVANIA.

DRIVING MECHANISM FOR FANS, &c.

SPECIFICATION forming part of Letters Patent No. 498,389, dated May 30, 1893.

Application filed June 8, 1891. Serial No. 395,508. (No model.)

*To all whom it may concern:*

Be it known that I, JOHN J. HARRITY, Jr., a citizen of the United States, and a resident of Philadelphia, Pennsylvania, have invented certain Improvements in Driving Mechanism for Fans, &c., of which the following is a specification.

The object of my invention is to connect a series of fans to a single shaft, dispensing with the use of pulleys and belts.

A further object of my invention is to construct friction mechanism for driving the fan shaft.

These objects I attain in the following manner, reference being had to the accompanying drawings, in which—

Figure 1, is a view showing a series of fans mounted in accordance with my invention. Fig. 2, is a view showing a form of driving mechanism. Fig. 3, is a vertical sectional view of Fig. 2; and Fig. 4, is a side view of a fan driving mechanism simplified.

A, A, A, are a series of fans mounted in a line, having frames B, and adapted to bearings $b$, $b$ on each frame is the driving shaft C.

D is the fan shaft situated at right angles to the driving shaft C, and adapted to bearings in the frame, on the upper side of each fan shaft is a disk $d$, and at the lower end of each fan shaft is the fan proper D'. On the driving shaft is a series of driving wheels $a$ preferably tired with rubber. These driving wheels are situated directly above each disk as shown, and the driving shaft drives the fan shafts through the wheels and disks. Under each disk is a supporting wheel or roller E on a shaft, which is adapted to bearings $e$, $e$ adjustable on the frame so that the wheel can be always kept in close contact with the disk preventing the driving wheel $a$ throwing the fan shaft out of line. Springs $e'$ are preferably placed under the bearings $e$, $e$, to keep the wheel E in contact with the disk. In some instances I need only drive through the medium of the driving wheel $a$, as shown in Fig. 4, but in certain cases it is preferable to make the roller E a driving wheel, as well as the wheel $a$; therefore I gear this wheel to the driving shaft, as clearly shown in Figs. 2 and 3.

On the shaft E' is a disk $f$ preferably forming part of the wheel $E^2$, and on the wheel $a^2$ is a flange $a'$ which overlaps the flange $f$ as shown in Figs. 2 and 3, and in order to obtain the requisite friction I mount on the shaft E' a disk $f'$, and back of this disk is a spring $g$ confined by a nut $g'$ which is adapted to a screw thread on the shaft E'. Thus the edge of the disk $a'$ is confined between the two disks $f$, $f'$, and the friction may be increased or decreased by adjusting the nut $g'$. On a shaft I is a disk $i$ which also enters the space between the disks $f$, $f'$ and being the same thickness as the flange $a'$ keeps the disks the proper distance apart.

In some instances I groove the upper and under sides of the disk $d$ as shown in Fig. 2, and provide tires for the wheels $a$ and E, which may be rounded to correspond with the grooves in the disk. These tires I prefer to make of rubber or leather.

As mentioned above the shaft E' is mounted in adjustable bearings $e$, $e$ which may be raised by the set screws $j$, $j$, and if necessary clamped in the raised position by screws $k$. The latter screws may be dispensed with in some cases if the bearings are suitably guided.

In some instances the spring $e'$ may be used to force the wheel and disk into frictional contact, dispensing with the adjusting screws.

The advantage gained by the above construction of driving mechanism for fans is that the belting heretofore used is entirely dispensed with, the line shafting driving the fan shafts through the friction gear and being supported by the frame work of the dependent fans.

When it is desired to throw out of gear one of the fans, the wheel E is lowered, and the disk $d$ locked out of engagement with the wheel $a$.

In some instances I may drive the wheel E from the wheel $a$ by increasing the diameter of either one or both of the wheels $a$ or E as shown by dotted lines in Fig. 4, so as to bring said wheels into frictional contact with each other as well as with the disk $d$.

It will be understood that this arrangement of gearing may be used in connection with other machinery without departing from my invention.

I claim as my invention—

1. The combination in driving mechanism for fans of a suspended frame, a shaft passing through said frame and mounted in bearings thereon, a vertical shaft at right angles to the driving shaft and adapted to bearings in said frame, a disk on said vertical shaft, and a friction driving wheel on the driving shaft and bearing upon the disk of the fan shaft whereby outside supports for the driving shaft are avoided, substantially as described.

2. The combination in a frictional driving device of the driving wheel, the driven disk at right angles thereto and in contact therewith, and a supplementary driving wheel rotated in the same plane with the primary driver, and in contact with both the driving wheel and the driven disk, substantially as described.

3. The combination in a frictional driving device, of the main driving shaft C, the flanged friction wheel $a$ carried thereby, the shaft E', a friction wheel E mounted thereon, a spring pressed disk also mounted on said shaft E' and adapted to press on the flange of the disk $a$, a driven shaft D, a disk $d$ mounted thereon, said disk $d$ being in frictional contact with said wheels $a$ and E, substantially as specified.

4. The combination in a frictional driving device, of the flanged driving wheel $a$, the supplemental driving wheel E, the spring pressed disk $f'$, the idle disk $i$ having a portion of its surface between the wheel F and the disk $f'$, and the driven disk in contact with the wheels $a$ and E, substantially as specified.

In testimony whereof I have signed my name to this specification in the presence of two subscribing witnesses.

JOHN J. HARRITY, JR.

Witnesses:
EUGENE ELTERICH,
HENRY HOWSON.